United States Patent [19]

Appelwick

[11] Patent Number: 5,293,903
[45] Date of Patent: Mar. 15, 1994

[54] T-CONNECTOR FOR USE IN PLUMBING

[75] Inventor: Brian E. Appelwick, Madison, S. Dak.

[73] Assignee: G. A. Murdock, Inc., Madison, S. Dak.

[21] Appl. No.: 936,928

[22] Filed: Aug. 27, 1992

[51] Int. Cl.⁵ .............................................. F16K 5/06
[52] U.S. Cl. ................................... 137/887; 285/39
[58] Field of Search ............... 285/156, 39; 137/861, 137/317, 887

[56] References Cited

U.S. PATENT DOCUMENTS

| | | | |
|---|---|---|---|
| 827,951 | 8/1906 | Anderson | 285/39 X |
| 1,165,705 | 12/1915 | Perkins . | |
| 1,780,402 | 11/1930 | Recko | 285/39 |
| 1,791,121 | 2/1931 | Cowles | 285/156 X |
| 2,225,153 | 12/1940 | Brown . | |
| 2,234,226 | 3/1941 | Bloch . | |
| 2,453,024 | 11/1948 | Lomelino | 285/156 X |
| 2,571,916 | 10/1951 | McKinley | 137/317 X |
| 2,829,645 | 4/1958 | Matteson . | |
| 3,091,483 | 5/1963 | Hruby, Jr. | 285/156 X |
| 3,337,181 | 8/1967 | Wennerstrom . | |
| 3,486,771 | 12/1969 | Coulin | 285/39 |
| 4,215,721 | 8/1980 | Heatherington . | |
| 4,685,156 | 8/1987 | Barbazon . | |
| 4,726,399 | 2/1988 | Miller . | |
| 4,832,083 | 5/1989 | Bruner | 137/861 |
| 4,887,644 | 12/1989 | Jeromson et al. | 137/887 X |

Primary Examiner—John C. Fox
Attorney, Agent, or Firm—Patterson & Keough

[57] ABSTRACT

A T-fitting for use in plumbing, particularly in the installation of an appliance that requires connection to the existing water supply to the building in the building in which the appliance is installed. The fitting has an inlet and an outlet having connectors for connecting to the existing water line after the water line has been cut. A second outlet is provided to connect to a water supply line to the appliance. Preferably, the second outlet has an integral valve so that the water may be regulated to the appliance without affecting the flow of water in the existing water line.

1 Claim, 1 Drawing Sheet ated to the installation task in doing the required plumbing work. These individuals are typically not fully equipped as a plumber would be, so the installation must be simply accomplished.

T-CONNECTOR FOR USE IN PLUMBING

TECHNICAL FIELD

The invention is a T-Connector for use in plumbing. Particularly, it is a T-Connector for use in installing point of use drinking water systems, feed lines to ice makers and feed lines to furnace humidifiers.

BACKGROUND OF THE INVENTION

The installation of point of use drinking water systems, feed lines to ice makers and feed lines to furnace humidifiers is a specialized profession. Typically, such installations are contracted for on a fixed price basis. Accordingly, it is very important to the individuals that make such installations that they be able to spend a minimum portion of the time that is allocated to the installation task in doing the required plumbing work. These individuals are typically not fully equipped as a plumber would be, so the installation must be simply accomplished.

From the customer's point of view, it is very important that the installation be done as neatly as possible. The customer rightly views the installation of such appliances as being a very sanitary type operation, especially installations that are related to drinking water. There is also an expectation that the installation will be done quickly, with a minimum of difficulty. This reinforces the expectation of the customer that the equipment that is installed will be clean and simple and troublefree. A complex installation process conveys the impression that the equipment is complex and may be troublesome for the new owner to both operate and maintain.

The plumbing portion of the installation is virtually always the same. The installation effectively involves tapping into an existing cold water line. When the installation is complete the integrity of the existing water line must be restored so that the line can continue to supply water to portions of the building as before. In practice, an existing cold water line is cut, usually with a tube cutter. A fitting is put in place that permits a portion of the water to be diverted to the new appliance. Alternatively, the line is pierced by a connector that is designated to pierce the line as the connecter is drawn into compression with the line. In more modern buildings, water line installations are virtually always tubes of either ¼ inch (⅜ O.D.); ⅜ inch (½ O.D.); or ½ inch (⅝ O.D.) in diameter. A supply line to the appliance being installed, the point of use drinking water system or ice maker, is virtually a ¼ inch or a ⅜ inch diameter line.

The installation should not require the skills and array of equipment that is available to a plumber. The installation must be within the skills and limited equipment of the installer. For these reasons soldering or threading of pipe is not desirable. Additionally, it is desirable to utilize the minimum number of parts in making the plumbing connection. This minimizes the stock of parts that the installer must have available in the vehicle that is used to make the installation call.

Any such connection, while being simply made, must also be reliable, long lasting, and not prone to leaking. Since the existing water line serves other areas in the building, a problem with the device that effects the interception of the water line affects more than just the new equipment installation. All water to the building may have to be shut down while repairs are effected. This is a considerable annoyance to the purchaser of the appliance and a considerable expense to the installer.

Further, costs of the parts used must be an absolute minimum. The sales and installation of such appliances is very competitive business. The installation must be seen by the customer as being cost effective. The purchase of the appliance must be seen by the customer as compelling when compared with other potential uses that the customer could make of limited resources.

In the past a number of individual components have been available to installers to perform the plumbing function during installation of point of use drinking water systems and ice makers. Typically, the components were assembled on-site during the installation. The assembly was made from a stock of parts that was carried in the installer's vehicle. Correct parts had to be assembled to mate with the specific size of water line in the building. This meant a great deal of mixing and matching of various individual components to effect the interception of the water line. The result was that the time for installation was greatly lengthened and costs were not minimized.

Additionally many of the components were made of polyvinyl chloride material and were designed to be assembled by gluing. The glue for such material emits a very strong, lingering odor which has been found to be objectionable. Adequate ventilation is strongly recommended by the manufacturer of the glue. It simply may not be practical or possible to have such ventilation during the installation process. Additionally, the glue is very messy. It readily adheres to the hands of the installer and once it has dried is very difficult to remove. The odor and appearance of the glue are not consistent with the neatness that is expected by the owner of the premises in which the appliance is being installed. Additionally, a glued joint should be allowed to set for twelve to twenty-four hours before subjecting the joint to water pressure in order to ensure a safe bond.

The components that were assembled to effect the installation described above typically came from a number of different suppliers. This created an inventory and ordering problem for the installers. A minimum of four different components, some of which were comprised of a number of individual parts, were required to perform the installation.

Alternatively, a piercing or saddle type of connector has been utilized. Such connectors have a sharp projection that is aimed at the existing water line. Adjustable bands encompass the line. As the bands are tightened around the line, the projection pierces the line. Further tightening of the bands brings the connector into compression with the water line. The object is to create a watertight seal with the line. Water to service the newly installed appliance is drawn off through the puncture in the line.

This type of device has the advantage of being easy to use and of being a single unit that effects the interception of the water line and is available from a single source. In practice, however, the piercing type of connector is frequently prone to leaking. The act of drawing the connector up tight on the water line simply is not adequate to effect a good seal. Once a leak develops, the punctured water line usually must be cut in order to be repaired, as there is no effective way to then make a good seal at the puncture. A number of states, including Minnesota, South Dakota, Illinois, Wisconsin, Michigan and others, have prohibited the use of piercing or saddle type connectors for these reasons. However, since up to now there has been no suitable alternative, these states are not enforcing the prohibition.

Accordingly, it would be a decided advantage to have a single device, readily available to the installer, that effectively would accomplish all the plumbing installation work for the point of use drinking water system, ice maker, or furnace humidifier.

SUMMARY OF THE INVENTION

The present invention is a single device that is ready to use by the installer without additional assembly. The invention performs the plumbing functions necessary for installing an appliance such as a drinking water system, an ice maker or a humidifier. It is a fitting that intercepts a water line that has been cut through by a single cut. The cut produces two opposing ends of the water line. The ends then define an outlet end of the water line and an inlet end of the water line.

The fitting is further connected to a water supply line of an appliance. The fitting has an inlet that is connected to the outlet of the water line. It has a first fitting outlet that is connected to the inlet of the water line. An internal fluid passage way in the fitting extends between the fitting inlet and the first fitting outlet. This passage way effects the passage of water from the outlet of the water line to the inlet of the water line.

A second internal fluid passage way is coupled to the first fluid passageway. The second internal fluid passageway diverts a portion of the flow of water from the first fluid passageway to the second passageway. A second fitting outlet is connected to the second fluid passageway and further is connected to the water supply line that supplies water to the appliance. This provides the diverted portion of flow of water to the water supply line.

DETAIL DESCRIPTION OF THE DRAWINGS

Figure 3:
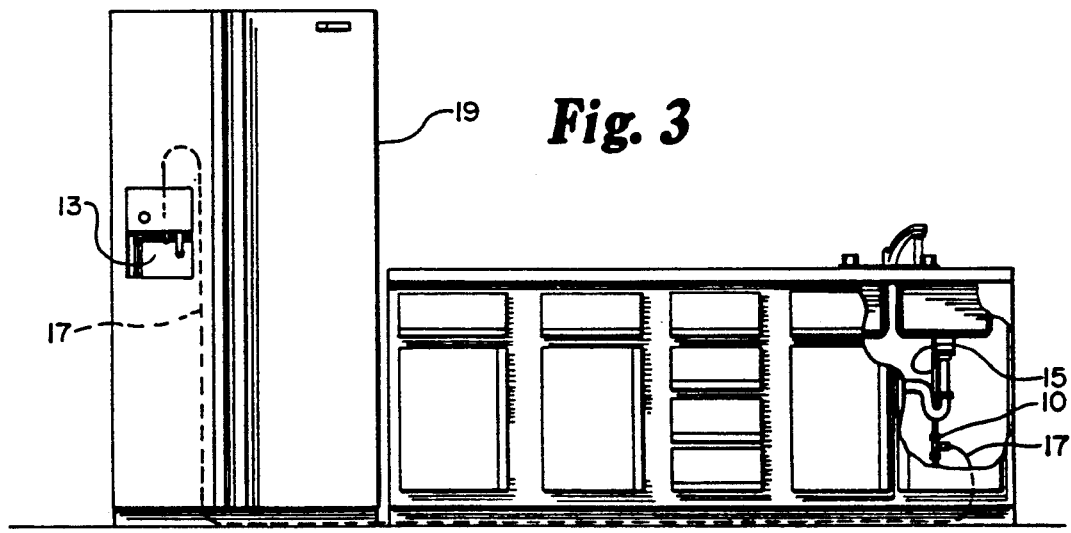
FIG. 3 is a perspective view of a typical installation of the invention to supply water to an ice maker installed in a refrigerator intended for use in a private home.

The T connection is shown generally at 10. T-connector 10 has a central T-fitting 12 with connectors 14 and 16 and valve assembly 18. A typical installation is as shown in FIG. 3. The installation is of a refrigerator-mounted ice maker 13. Such installations are usually made sometime after construction of the home or building in which the appliance is installed. Interception of the existing water line 15 is made with as little disruption of the existing building structure as possible. This means that holes should not be bored in walls and the like. For installation in a living space, the installation should be as unobtrusive as possible. Unsightly plumbing should be avoided.

Practically, the above constraints mean that the existing water line 15 will be intercepted in the cabinet beneath the sink. The existing water line 15 is usually copper or plastic tubing. In the limited space available, a cut of the existing water line 15 with a tube cutter is relatively easy. The supply line 17 to the ice maker 13 will be made as invisible as possible. It is shown in phantom installed behind the cabinet to the rear of the refrigerator 19.

T-fitting 12 has an interior passage way 20 that is in the shape of a T. The straight line portion of interior passageway 20, that effectively forms the top, horizontal portion of the T, is for connecting to an existing water line. Since water flows in the water line in only one direction, an inlet and an outlet of T-connector 10 can arbitrarily be assigned. In the drawings, it is assumed that water flows through the straight line portion of interior passage 20 from top to bottom. The upper side of the T-fitting 12 then is the inlet 23 and the lower side is the outlet 25 for the existing water line.

T-fitting 12 is designed to facilitate the rapid connection of an appliance to an existing water line. Accordingly, both the inlet and an outlet end of the straight line portion of T-fitting 12 have threads 22 and 24 respectively to effect a quick installation. Flats 26 are formed in the exterior surface of T-fitting 12 between threads 22, 24. Flats 26 are included so that T-fitting 12 may be readily grasped by a wrench or pliers during the installation process.

Second outlet 28 is at a right angle to the straight line portion of T-fitting 12 and is effectively the vertical portion of the T. Second outlet 28 is adapted for supplying water to the appliance being installed. Accordingly, interior passageway 29 is connected to interior passageway 20 for receiving water therefrom. Second outlet 28 has a smooth cylindrical exterior surface that is adapted for being received within a cylindrical interior surface of valve assembly 18 and for being cemented to valve assembly 18. Such cementing is performed prior to delivery to the installer.

Inlet connector 14 and outlet connector 16 are identical devices. Accordingly, they will be described using identical numerals. Connectors 14, 16 are of a known type in the industry that compressively retains and seals a line that is inserted therein. A portion of the exterior surface of connectors 14, 16 is formed with hexagonal flats 30. Hexagonal flats 30 are provided to facilitate use of a wrench or pliers in assembling T-connector 10 to the water line.

Connectors 14, 16 have an interior passageway 36. Interior passageway 36 is designed to fluidly connect to interior passageway 20 of T-fitting 12, thereby forming a straight line fluid path through T-fitting 12. Interior passageway 36 is designed to be generally of the same diameter as interior passageway 29 of T-fitting 12.

Interior passageway 36 expands to form threaded recess 38. Threaded recess 38 is designed to mate with the threads 22, 24 of T-fitting 12. Washer 40 is carried within recess 38 and abuts face 42 of threaded recess 38. In the preferred embodiment shown, washer 40 is made of a non-corrosive metallic material. Washer 40 has inwardly directed teeth 44 that are arranged in a circular pattern.

Elongated compressible washer 46 is held between washer 40 and beveled face 48 of T-fitting 12. Teeth 44 of washer 40 are arranged in a circular pattern having a slightly smaller diameter than interior passageway 50 of washer 46. Teeth 44 are inwardly directly such that when compressible washer 46 is in place they are internal to interior passageway 50 centering washer 46 in recess 38. This centering action also aligns washer 46 longitudinally with interior passageway 20 of T-fitting 12, ensuring uniform compression of washer 46. Washer 46 is preferably made of a rubber material that retains its pliable characteristics over time, such that it maintains its ability to effectively seal the water line junction with connector 10.

In the preferred embodiment valve assembly 18 has a first interior passageway 52. Valve assembly 18 is permanently affixed to T-fitting 12. First interior passageway 52 has an interior diameter that is slightly greater than the exterior diameter 53 of outlet 28. First interior passageway 52 is slipped over outlet 28 and cemented into place with known plastic cement.

Valve assembly 18 has interior passageway 54 therethrough. Interior passageway 54 is fluidly connected to interior passageway 20 of T-fitting 12. Ball valve 56 is disposed and interior passageway 54. Ball valve 56 has an interior passageway 58 therethrough. Interior passageway 58 may be selectively aligned with interior passageway 54 or it may be turned as much as 90 degrees with respect to the longitudinal axis of interior passageway 54. When turned 90 degrees with respect to the longitudinal axis of interior passageway 54, ball valve 56 effectively fluidly seals interior passageway 54 such that no water is able to pass through.

Figure 1:
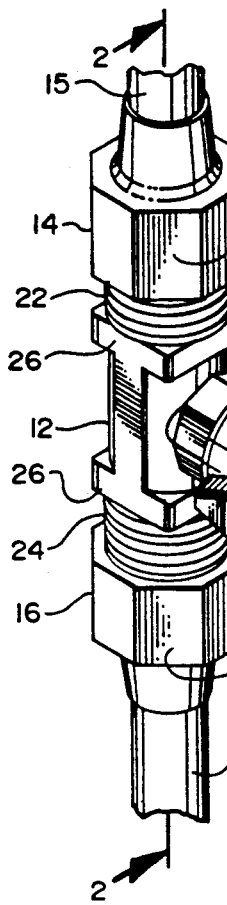
FIG. 1 is a perspective view of a T-fitting connector in accordance with the present invention.
Figure 2:
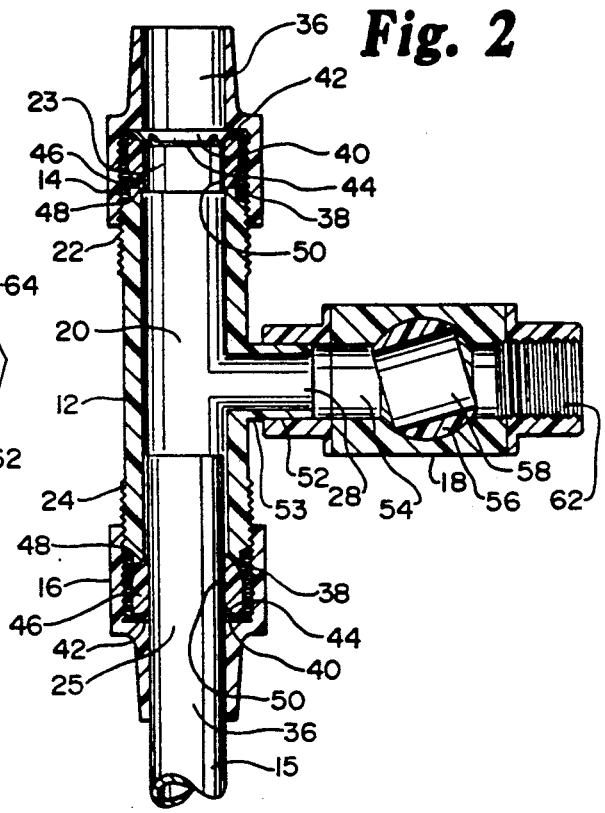
FIG. 2 is a sectional view of a present invention taken along line 2—2 of FIG. 1.

Ball valve 56 is manually controlled by handle 60. Handle 60 has stops 61 that limit its rotation to 90 degrees. The longitudinal axis of handle 60 is aligned with the longitudinal axis of interior passageway 58 of ball valve 56. This provides a quick visual indication of whether vall valve 56 is open or closed. In the position shown in FIG. 1, handle 60 indicates that interior passageway 58 is aligned with interior passageway 54 and valve 56 is open to the passage of water.

The outlet end of internal passageway 54 has interior threads 62. Threads 62 are adapted for mating with a connector on the water supply line that leads to the appliance that is being installed. Standardized supply lines are used on such appliances so that threads 62 mate with virtually all such supply lines without further adapters.

Flats 64 are provided on the exterior surface of valve assembly 18. Flats 64 may be firmly grasped by a wrench or pliers to aid in effecting a good threaded fit with the supply line.

In operation T-connector 10 is utilized to intercept an existing water line in a building. T-connector 10 is designed to be installed using only a cutting tool for cutting the existing water line and two tightening tools, such as wrenches or pliers for tightening the threaded portions.

The installer makes a single circumferential cut in the existing water line. This is best done with a tube cutter. The cut creates an outlet end of the existing water line and an inlet end of the exisitng water line. The output end of the existing water line is slipped into inlet connector 14. The inlet end of existing water line is slipped into output connector 16. In both cases, the outside diameter of the existing water line is slightly less than the interior diameter of passage way 36 in connectors 14, 16 so that the fitting between the existing water line and the respective connector 14 or 16 is very close.

The ends of the water line are slipped all the way through connectors 14, 16 such that the ends abut bevel face 48 of T-fitting 12. In this position, the ends of the water line are fully encompassed by washer 40 and compressible washer 46. Connectors 14, 16 are then threaded tightly onto the respective threads 22, 24 of T-fitting 12. Wrenches or pliers may be worked against each other to tighten connecters 14, 16. This is accomplished by engaging T-fitting 12 by flats 26 and connectors 14, 16 by flats 30 with the tightening tools.

As connectors 14, 16 are tigthened down, compressible washer 46 is compressed between washer 40 and beveled face 48 of T-fitting 12. As compressible washer 46 is compressed, the interior diameter of passageway 50 is reduced. This reduction in interior diameter causes compressible washer 46 to tightly grip the end of the existing water line. This action both retains the end of existing water line within T-connector 10 and creates a fluid seal between the end of the existing water line and T-connector 10. When connectors 14, 16 are tightened in place, the fluid integrity of the existing water line is restored. Water is then free to flow again from the output of the water line to the inlet of the water line.

In the majority of buildings, existing water lines are either ¼ inch, ⅜ inch, or ½ inch. Accordingly, T-fitting 12 and connectors 14, 16 are provide to installers in three sizes to accommodate the three different existing water line sizes.

The appliances being serviced by T-connector 10 have uniformly consistent water feed lines. All such lines are either ¼ inch or ⅜ inch and have an adapter on the end that is suitable for mating with threads 62 of valve assembly 18. When threaded into place, the connector on the feed line to the appliance holds the feed line in place and creates a fluid seal with valve assembly 18.

Ball valve 56 is utilized to selectively admit and deny water from the appliance being installed. This can be done without affecting the water flow in the existing water line that is intercepted by T-connector 10, since flow in the straight portion of T-fitting 12 is not affected by the position of ball valve 56.

I claim:

1. A plumbing T-connector, adapted for being readily installed in a fluid conveying conduit and for fluid coupling to a branch conduit, said connector having a T-shaped body defining an inlet and a main outlet being coaxial with the inlet, and a branch outlet having an axis transverse to the axis of the inlet and the main outlet, the T-shaped body being generally tubular in exterior shape, having an outside diameter, and a first set of gripping flats is formed adjacent the inlet and a second set of gripping flats is formed adjacent the main outlet, each set of gripping flats being four sided and each side being generally equal in length to the outside diameter of the body and defining a tangent of the generally tubular body, said body further defining a conduit fluidly coupling the inlet, the main outlet and the branch outlet, said T-connector further including first and second compression fittings threadedly carried by said body at said inlet and said main outlet for sealingly engaging the exterior of the fluid conveying conduit, and first gripping means formed integral to said body adapted for being gripped by an implement to oppose rotational forces applied to the compression fittings while said fittings are being rotated in threaded engagement with the body, said first gripping means further comprising at least one pair of opposed flats comprising opposed flat external surfaces integral to said body, each of said flats defining a plane that is oriented generally perpendicular to the axis of the inlet and the main outlet of the body.

* * * * *